Dec. 4, 1956     L. L. KRAMER     2,772,785
MILK FILTER OR THE LIKE
Filed Aug. 17, 1954
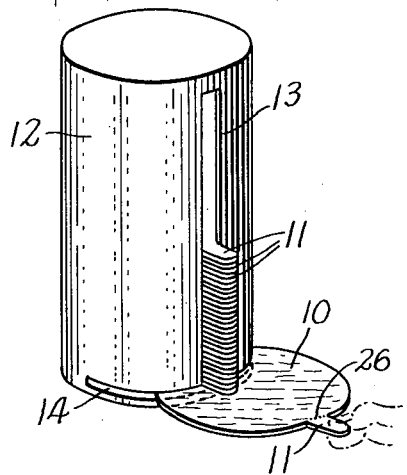
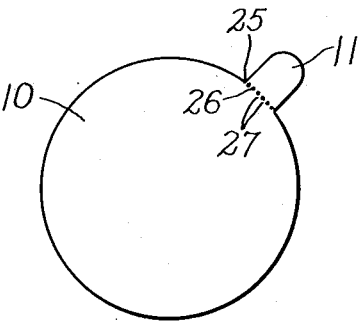
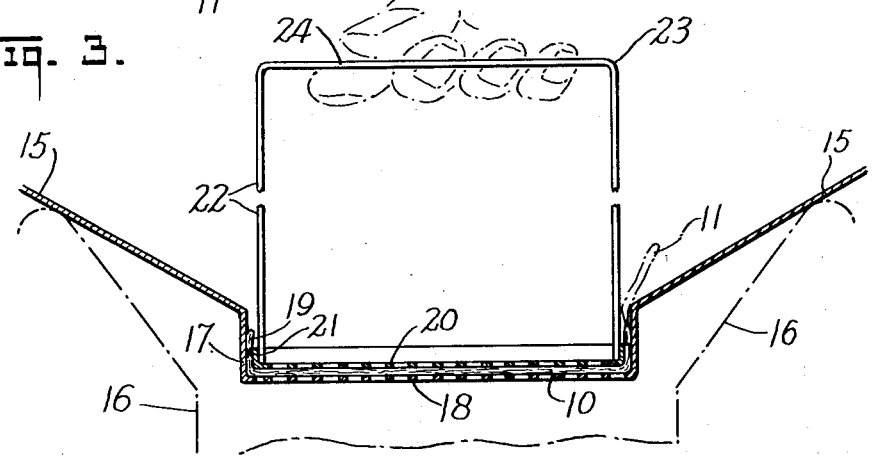
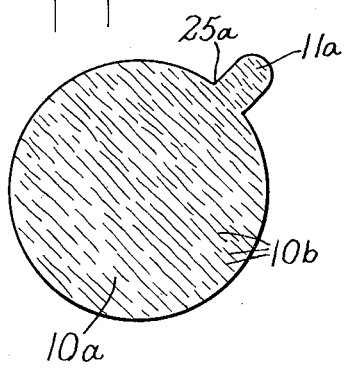
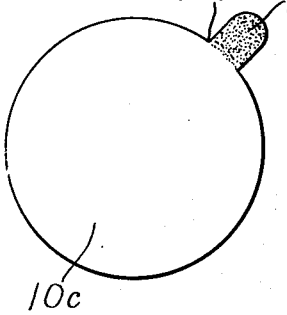
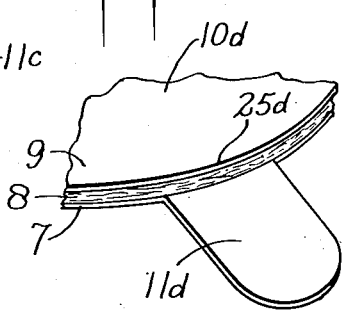
INVENTOR
Lewis L. Kramer
BY
his ATTORNEY
Witness:
Mark Bassecher United States Patent Office 2,772,785
Patented Dec. 4, 1956

2,772,785

MILK FILTER OR THE LIKE

Lewis L. Kramer, New York, N. Y.

Application August 17, 1954, Serial No. 450,321

8 Claims. (Cl. 210—158)

This invention relates to filtering, and more particularly to milk filtering, and still more particularly to filters therefor.

Known to me is the procedure for carrying out filtering operations, particularly for milk, where in transposing the freshly collected milk to milk cans, it is desirable to filter the milk and remove solids drifting into open containers during the milking operation.

It is known to me also to employ milk filters exemplified in the patents to Wolfe 2,101,770 of Dec. 7, 1937, and Brant 2,483,000 of Sept. 27, 1949, in which a funnel-shaped reservoir or bowl is formed with a screen or strainer seat, upon which is placed a filter of cloth, felt, combed or carded fibre, and over which a second strainer and disc clamp is applied, to hold the filter in position, weighting it as well as anchoring it against displacement on the seat.

Such manipulation to prepare the filter funnel, reservoir or bowl requires handling of the filter by the milker, which is likely to lead to contamination unless hygienic conditions are observed to the utmost.

Accordingly, it is an object of this invention to provide filtering apparatus and filters therefor which will minimize the contamination and bacterial infection of the filter used in carrying out the aforesaid or like filtering operations. More specifically, it is an object of this invention to provide a filtering apparatus and filter member therefor in which a filter may be positioned and anchored in position on the seat between a primary and a second strainer, without leaving any portion in contact with the milk which passes over the filter.

More specifically, it is an object of my invention to provide a filter member in which the primary body includes a border or peripheral, manual gripping portion connected to each other by a weakened connection whereby, in manually positioning the filter and anchoring the filter in position, the gripping portion may be readily severed, to dispose of the gripping portion and remove it from contact with the milk or other material to be filtered, thereby avoiding the contamination or bacterial infection of the milk which may otherwise pass over such gripping portion.

Still more particularly, it is an object of my invention to provide a filter disk for filtering operations, particularly of milk and like fluid comestibles, in which disks of carded cotton, with or without wet strengthening components, have the body thereof provided with finger gripping tabs which, in relation to each other, are so formed as to permit ready separation of the gripping tabs. After manual contact with and positioning of the filter disk in the filter assembly of funnel and strainers, the gripping portion or tab is readily severed, removed from the bowl or funnel, thereby removing any portion which may have been contaminated by contacting the hand, from being brought into contact with the milk or the like.

Still more particularly, it is an object of my invention to provide a filter disk of loosely associated, carded fibre in which the main body of the filter has, on a portion thereof, such as the border, a manual gripping portion and, more particularly, a manual gripping portion connected to the main body of the filter by a weakened line, or still more particularly, in which the tab portion is connected to the body by a row of perforations, or still more particularly, by connecting the tab to the body along the oriented line of carding, whereby severance of the tab may be facilitated, without affecting the position or the efficiency of the main filter body.

Still more particularly, it is an object of my invention to provide a filter assembly which will assure minimizing contamination by manual handling of the associated parts.

Still more particularly, it is an object of my invention to provide a dispenser for filters which presents the filters in a manner to minimize contamination of the main filter body.

To attain these objects and such further objects as may appear herein or be hereinafter pointed out, I make reference to the accompanying drawing, forming a part hereof, in which—

Figure 1 is a perspective view of a dispenser for filters in accordance with my invention;

Figure 2 is a magnified plan view of the filter shown in Figure 1;

Figure 3 is a fragmentary magnified sectional view of the strainer seat of a milk reservoir or filter bowl, to illustrate the use of filters in accordance with my invention;

Figure 4 is a plan view of another embodiment of my invention;

Figure 5 is a plan view of a still further embodiment of my invention;

Figure 6 is a fragmentary perspective view of a still further embodiment of my invention.

Making reference to the drawing, it is contemplated by me to provide a filter 10 having a manual gripping portion or tab 11. Such filters may be of disk shape and stacked in the dispenser 12 which has a conforming outline, for retaining a number of such filters. The dispensing container has a slot 13, through which the tabs 11 project along its length. At the bottom of the dispenser, a slot 14 extends for about 180° and is of a depth corresponding to the thickness of the filter so as to merge with the slot 13.

It will be observed that a stack of such filters may be withdrawn one at a time through the slot 14, by grasping the lowermost tab 11 and drawing it from the stack. Manipulation is thereby confined to the tab 11, and by such manual operation it may then be removed to the filter assembly shown in Figure 3, wherein the reservoir or bowl shaped funnel 15 is shown superimposed over the mouth of the milk can 16, outlined in dotted lines.

The reservoir or filtering bowl which is illustrated has a filter seat 17 of generally cylindrical outline, terminating in a screen or strainer portion 18. It is within this seat that the filter 10 is positioned, extending some of the border edges 19 in an upwardly curled position along the walls of the seat 17. This operation is performed more readily by pressing the upper strainer 20 over the filter to shape the border about the strainer.

The strainer 20 is provided with a flange 21, from which extends a handle portion 22, generally U-shaped at 23, so that the gripping portion 24 may extend well above the rim of the bowl 15 and well above the level of the fluid which may be poured over the strainer and filter assembly. In this position, while clampingly pressing the upper strainer 20 on the filter, the tab 11 may be severed from the body of the filter 10 clamped between the strainers 18 and 20. In this manner it will be observed that any contaminating influence from this source is removed, and particularly where the hand gripping portion 24 is above the edge of the bowl or above the normal liquid level, possible contamination from this source is likewise avoided.

The cooperative pressure which is exercised by the flange 21 as it is manually held against the filter, while pulling the tab 11, provides the means for preventing contamination by the removal of the tab where the filter constitutes readily severable material, such as paper or carded cotton, as distinguished from felted material or woven, flannel-like material or other cloth.

In accordance with a more specific phase of my invention for the provision of a filter having a manual gripping portion with a weakened connection between the tab 11 and the body portion 10, I make reference to other filtering materials which may be employed. Where carded cotton is used for making the filter body 10, particularly where the surface is bonded by wet strengthening agents, I provide the filter 10 adjacent the shoulder 25 with perforations or incisions 26, to leave readily severable segments 27 holding the tab 11 to the body 10, with sufficient force to be handled and to take a single element from a dispenser without breakage. In this manner, an integral construction of tab 11 and filter body 10 may be employed, relying upon the weakened connection to facilitate removal of the tab after it is positioned over the strainer 18, as previously described.

Other weakened connection between the tab 11 and the body 10 may be resorted to, and for this purpose I refer to Figures 4, 5 and 6.

In Figure 4, the filter body 10a is shown with the orientation of the fibers 10b. The tab 11a is located so that the shoulder portion 25a is positioned in parallelism with the length of the filaments of the carded cotton material which is employed. Thus, the filaments are carded at right angles to the longitudinal axis of the tab. This provides a weakened connection between the tab 11a and the body 10a, facilitating severance in the manner previously described.

In Figure 5, the filter body 10c is provided with a tab 11c. The tab from the shoulder portion 25c to the end of the tab is strengthened by impregnating with some strengthening agent, such as collodion, nitro-cellulose or similar plastic, which provides a weakened line of breakage at the shoulder portion 25c by reason of the integration of the tab as compared with the parting line adjacent the shoulder portion 25c. This integrated treatment of the tab may facilitate separation of one filter element from beneath the superimposed stock when held in the dispenser, as shown in Figure 1.

In Figure 6 a still further embodiment is illustrated where the filter body 10d constitutes as plurality of layers of filter material, such as separately carded plies 7, 8 and 9. In this embodiment the various plies may be carded at angles to each other for strengthening the filter and, accordingly, the edges 25d of the upper layers 8 and 9 are severed to leave a single ply tab 11d. The tab 11d may be integrated by treatment with some coating material, such as nitro-cellulose or some other integrating plastic, and thereby facilitate severance along the shoulder portion 25d, as described in connection with the embodiment illustrated in Figure 5.

It will be understood that while in the embodiments illustrated in Figures 4, 5 and 6, weakened lines of perforation are not illustrated by reason of the relationship of the tabs to the body or the character of the treatment given to the tabs, the severance of the tabs may be further augmented by also including along the shoulder line described perforations or slits.

It will thus be observed that I have provided a novel filtering assembly whereby the parts which are engaged manually may be removed from contact with the liquid, such as milk, to be filtered, and that more specifically I have provided novel filter media for use in handling perishable articles which may be contaminated and infected if the portion which is manually contacted is not removed.

It will be understood that while I have illustrated the filter of paper or carded cotton, other filter bodies may be employed, such as weakened, disposable cellulose or integrated fibres in which a readily separable tab is applied or assembled, to carry out the foregoing objective by the pull against the filter clamping or anchoring means.

Having thus described my invention and illustrated its use, what I claim as new and desire to secure by Letters Patent, is:

1. A filter for the purposes described comprising a body portion of filtering material of the class consisting of milk filter paper, carded cotton milk filter sheets, and carded cellulose milk filter sheets through which filtering operations are conducted and a border portion, and a manual gripping portion having a weakened connection with the body at the shoulder between the gripping portion and a border portion.

2. A filter for the purposes described comprising a body portion of carded cotton, a border portion of which has integrally formed therewith a manual gripping portion having a weakened connection with the body portion whereby severance along such weakened portion may be readily affected.

3. A filter in accordance with claim 1 wherein such weakened connection consists of a line of perforations at the shoulder portion.

4. A filter in accordance with claim 1 wherein such weakened connection is effected by integrating the manual gripping portion to have greater strength at the shoulder portion between the gripping portion and the border portion.

5. A filter in accordance with claim 2 wherein the carded cotton has the filaments thereof oriented in parallelism in the gripping portion and body portion and substantially at right angles to the longitudinal axis of the gripping portion whereby severance may be effected along the grain of the carded filaments.

6. A filter in accordance with claim 2 wherein the body portion comprises a plurality of laminations and the manual gripping portion comprises a lesser number of laminations.

7. In a filter assembly comprising a funnel or reservoir having a filter seat and superimposed strainers for holding a milk filter on said filter seat, the combination therewith of a filter sheet of the class consisting of milk filter paper, carded cotton milk filter sheets and carded cellulose milk filter sheets including a body portion and a border anchored by one of said strainers, said body portion having a gripping tab projecting to one side of a strainer and severable while holding the strainer in position, whereby the contaminating influence in contacting the tab may be removed before filtering.

8. A method for filtering which includes positioning in a filter bowl having a filter seat, a filter member including a tab, clamping the filter in position by a strainer and then severing the tab from the body thereof.

References Cited in the file of this patent

UNITED STATES PATENTS

| | | |
|---|---|---|
| 1,889,111 | Serr | Nov. 29, 1932 |
| 1,933,468 | Abbot | Oct. 31, 1933 |
| 2,042,799 | Ort | June 2, 1936 |
| 2,483,000 | Brant | Sept. 27, 1949 |
| 2,680,558 | Mai | June 8, 1954 |